US008760983B2

(12) United States Patent
Suzuki et al.

(10) Patent No.: US 8,760,983 B2
(45) Date of Patent: Jun. 24, 2014

(54) INFORMATION RECORDING APPARATUS, INFORMATION PLAYBACK APPARATUS, AND FORMATTING METHOD

(71) Applicant: Kabushiki Kaisha Toshiba, Tokyo (JP)

(72) Inventors: Kenichiro Suzuki, Yokohama (JP); Kazuhito Shimomura, Fussa (JP); Yuji Sakai, Yokohama (JP); Sumio Kuroda, Yokohama (JP); Kouichi Ogi, Hanno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/957,874

(22) Filed: Aug. 2, 2013

(65) Prior Publication Data

US 2014/0043949 A1  Feb. 13, 2014

(30) Foreign Application Priority Data

Aug. 8, 2012 (JP) ................................. 2012-176383
Jun. 6, 2013 (JP) ................................. 2013-119959

(51) Int. Cl.
*G11B 7/00* (2006.01)
*G11B 5/09* (2006.01)

(52) U.S. Cl.
USPC .................... 369/47.23; 369/59.1; 369/59.23; 369/47.1; 360/39; 360/53

(58) Field of Classification Search
None
See application file for complete search history.

(56) References Cited

U.S. PATENT DOCUMENTS

| | | | | |
|---|---|---|---|---|
| 5,696,933 A * | 12/1997 | Itoh et al. | ...................... | 711/114 |
| 5,809,516 A * | 9/1998 | Ukai et al. | ..................... | 711/114 |
| 7,016,601 B1 * | 3/2006 | Yoneya et al. | ................ | 386/239 |
| 8,422,850 B2 * | 4/2013 | Nakane | .......................... | 386/232 |

FOREIGN PATENT DOCUMENTS

| | | |
|---|---|---|
| JP | 05-073226 A | 3/1993 |
| JP | 2004-342204 A | 12/2004 |
| JP | 2005-302111 A | 10/2005 |
| JP | 2010-123167 A | 6/2010 |

* cited by examiner

*Primary Examiner* — Muhammad N Edun
(74) *Attorney, Agent, or Firm* — Knobbe, Martens, Olson & Bear LLP

(57) ABSTRACT

According to one embodiment, an information recording apparatus includes a divider, a generator, and a recorder. The divider is configured to divide recording data into a plurality of recording data blocks for each predetermined recording unit. The generator is configured to set, as a first block set, n recording data blocks recorded in corresponding areas in file system management areas of n, first to nth (n: integer, n≥2) storages, and generate first parity data from the n recording data blocks forming the first block set. The recorder is configured to record the n recording data blocks forming the first block set and the first parity data.

11 Claims, 18 Drawing Sheets

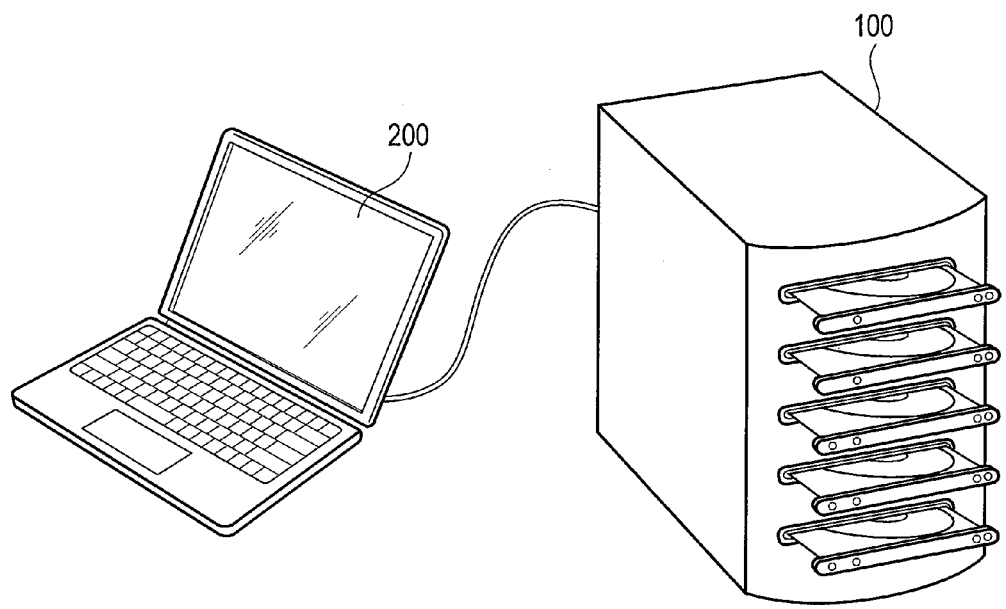
F I G. 1A
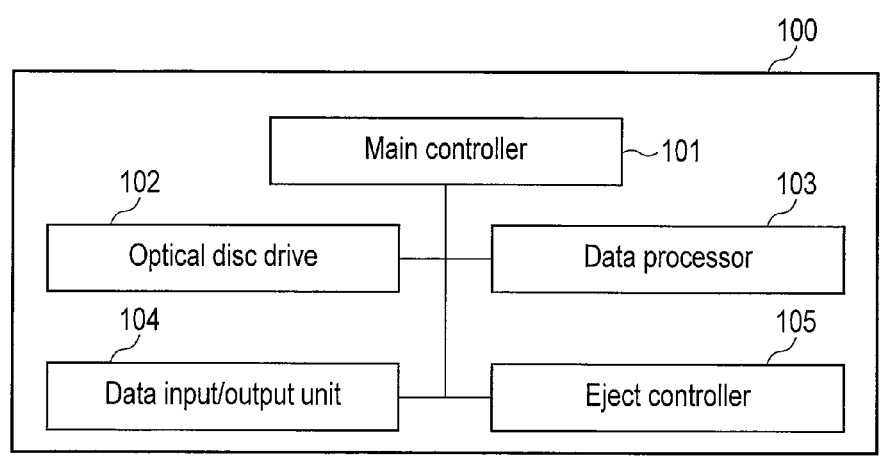
F I G. 1B

Data1

Data1

1 cluster size
(64kB)

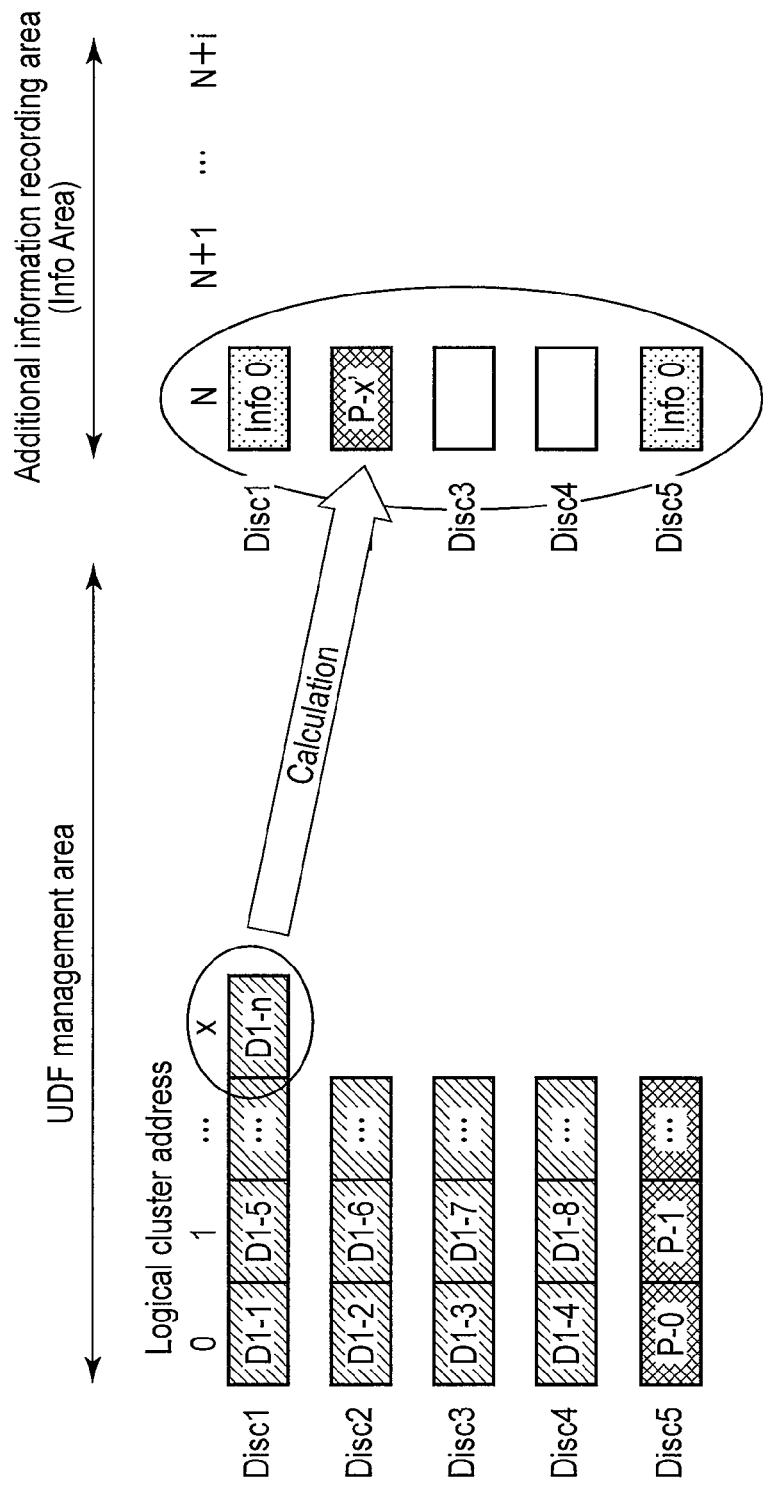
F I G. 15

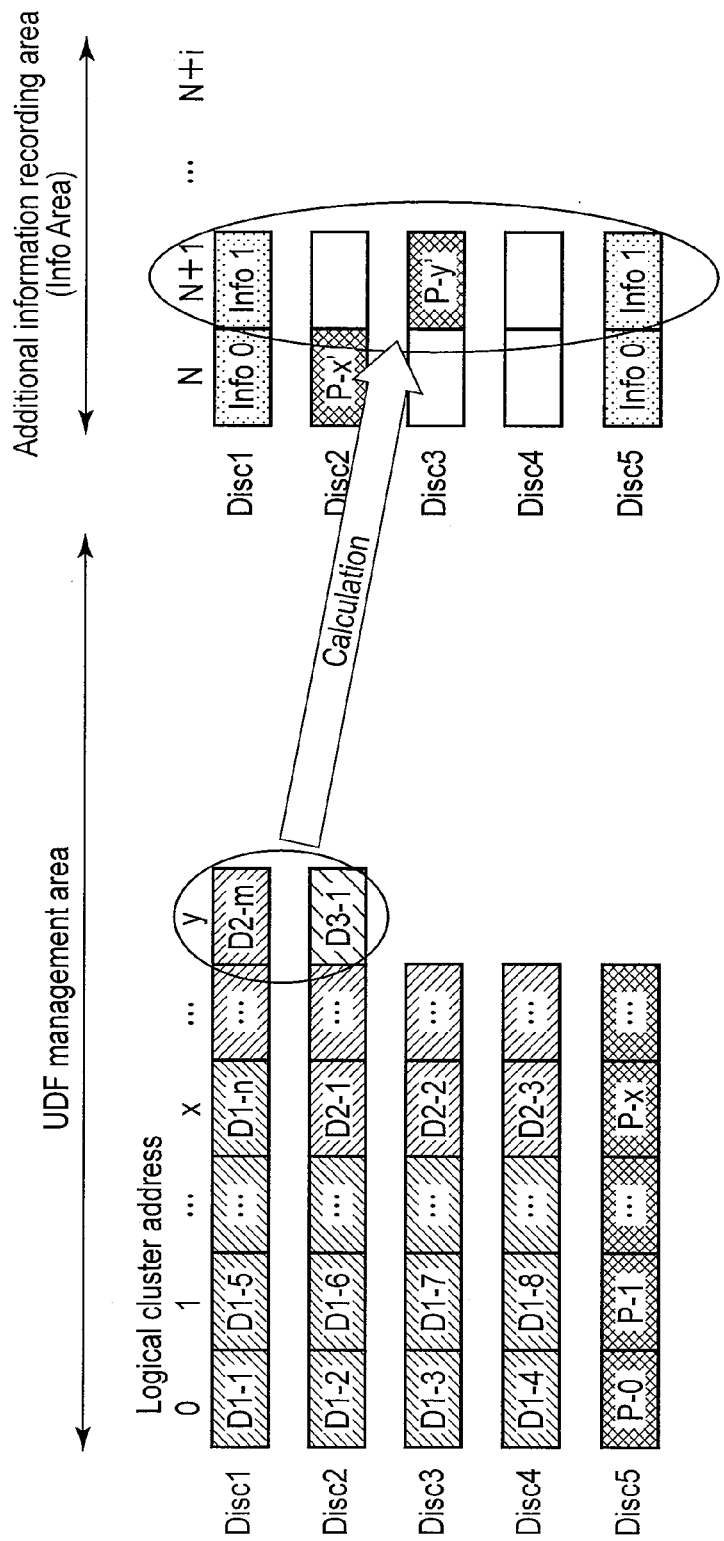
F I G. 16

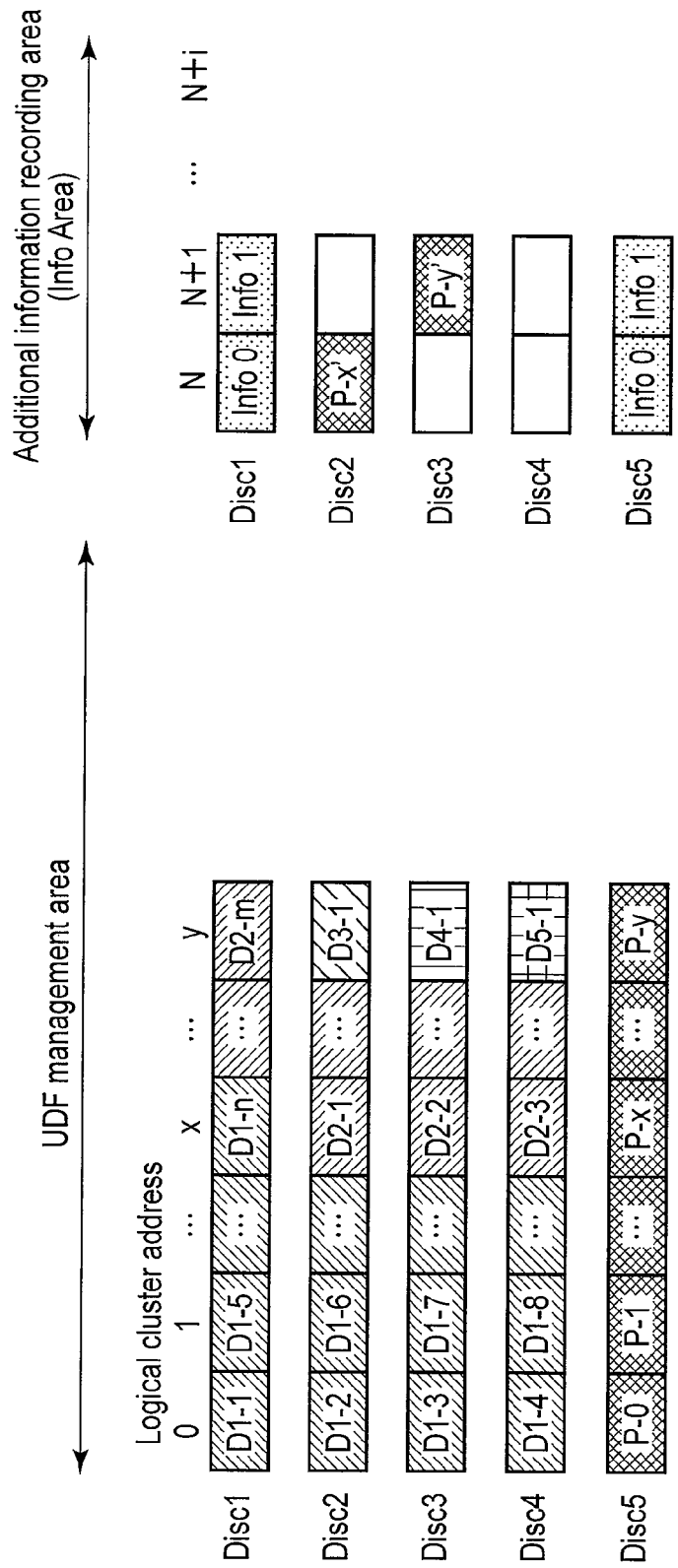
F I G. 19

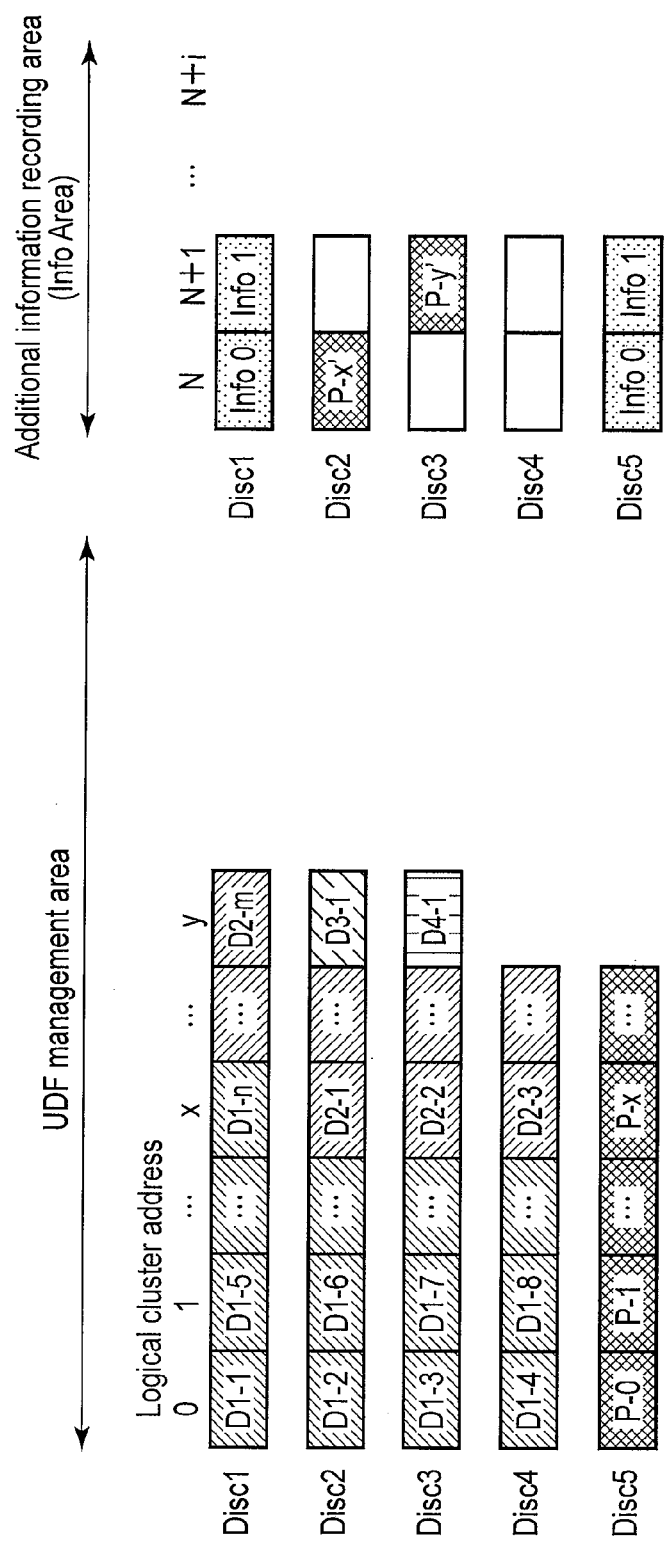
F I G. 20

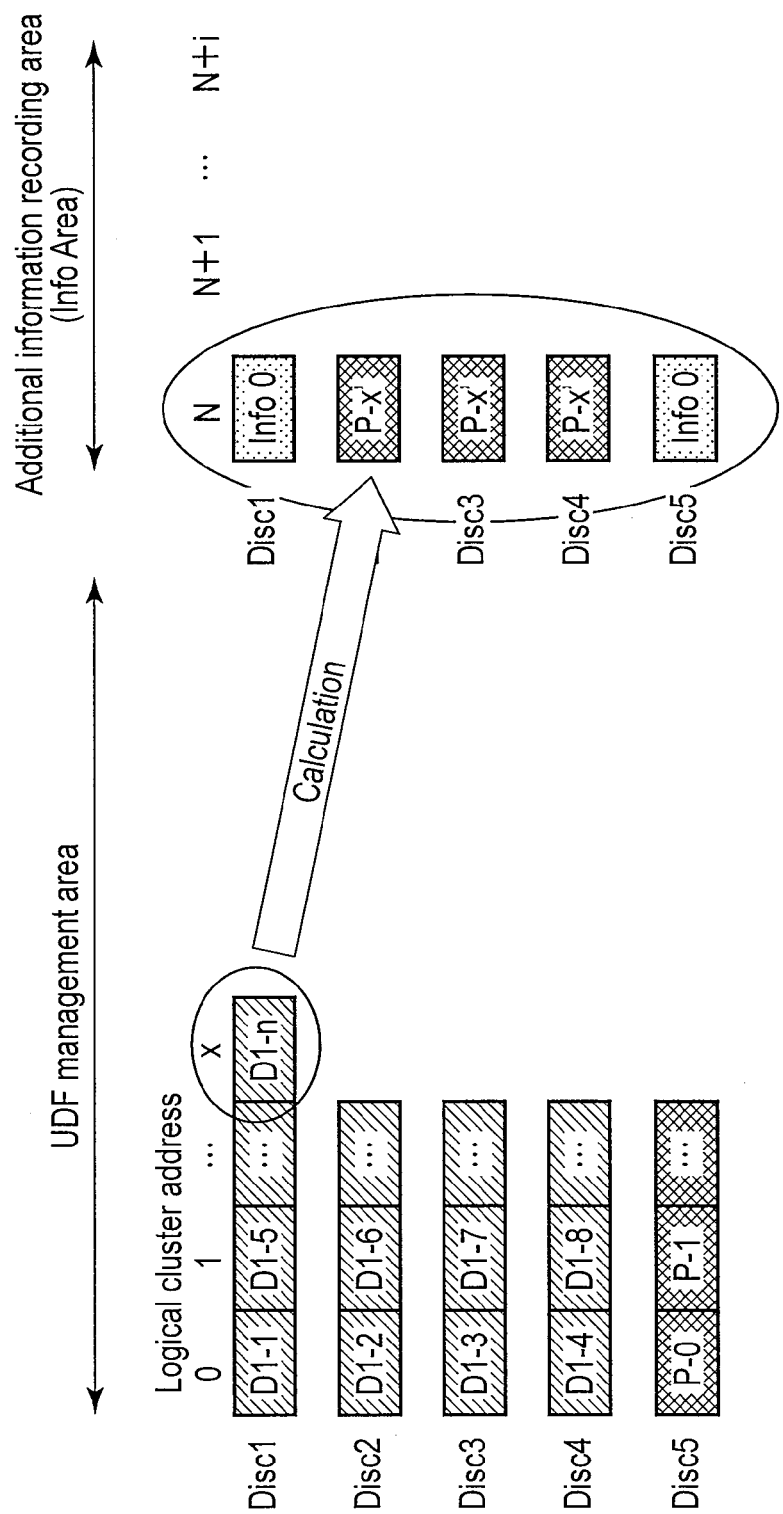
F I G. 21

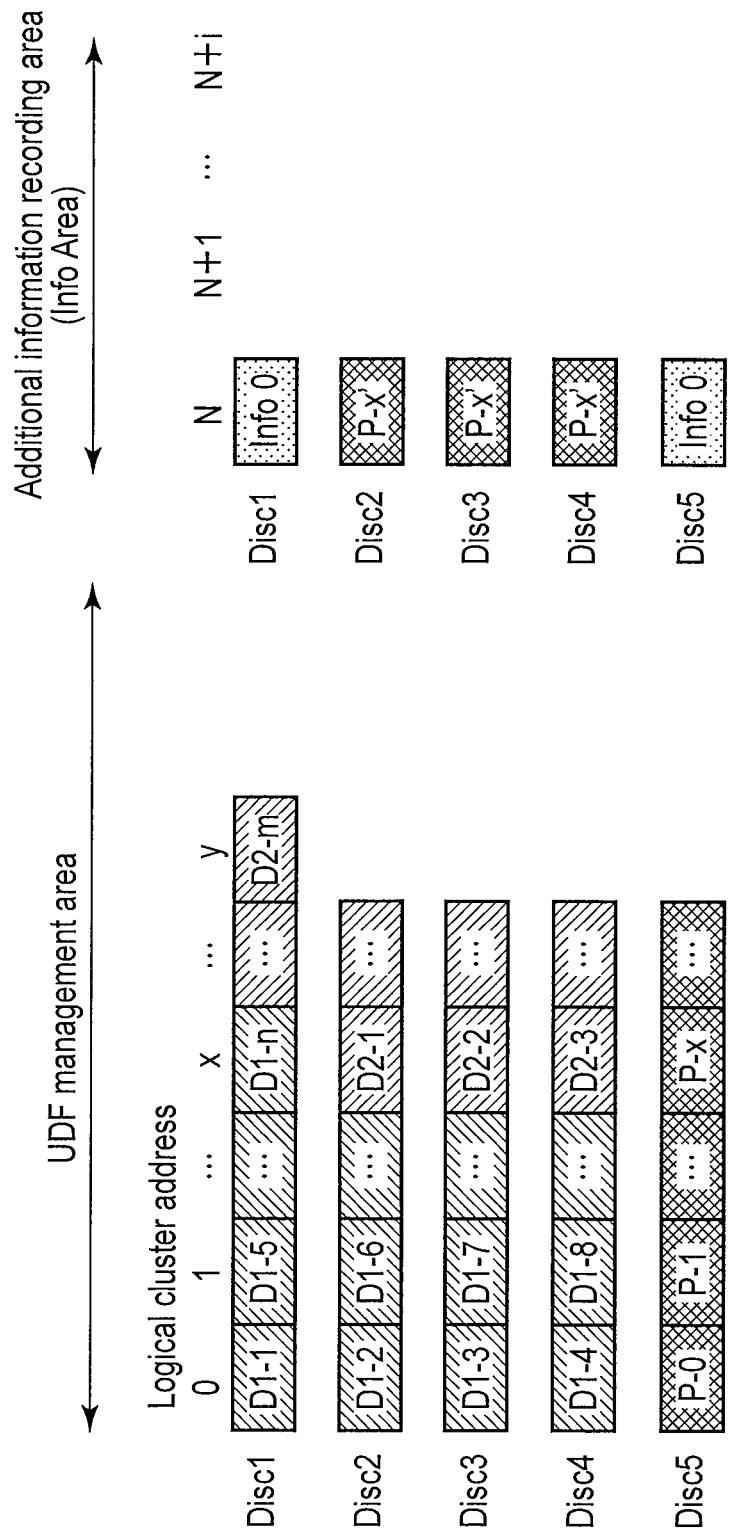
F I G. 22

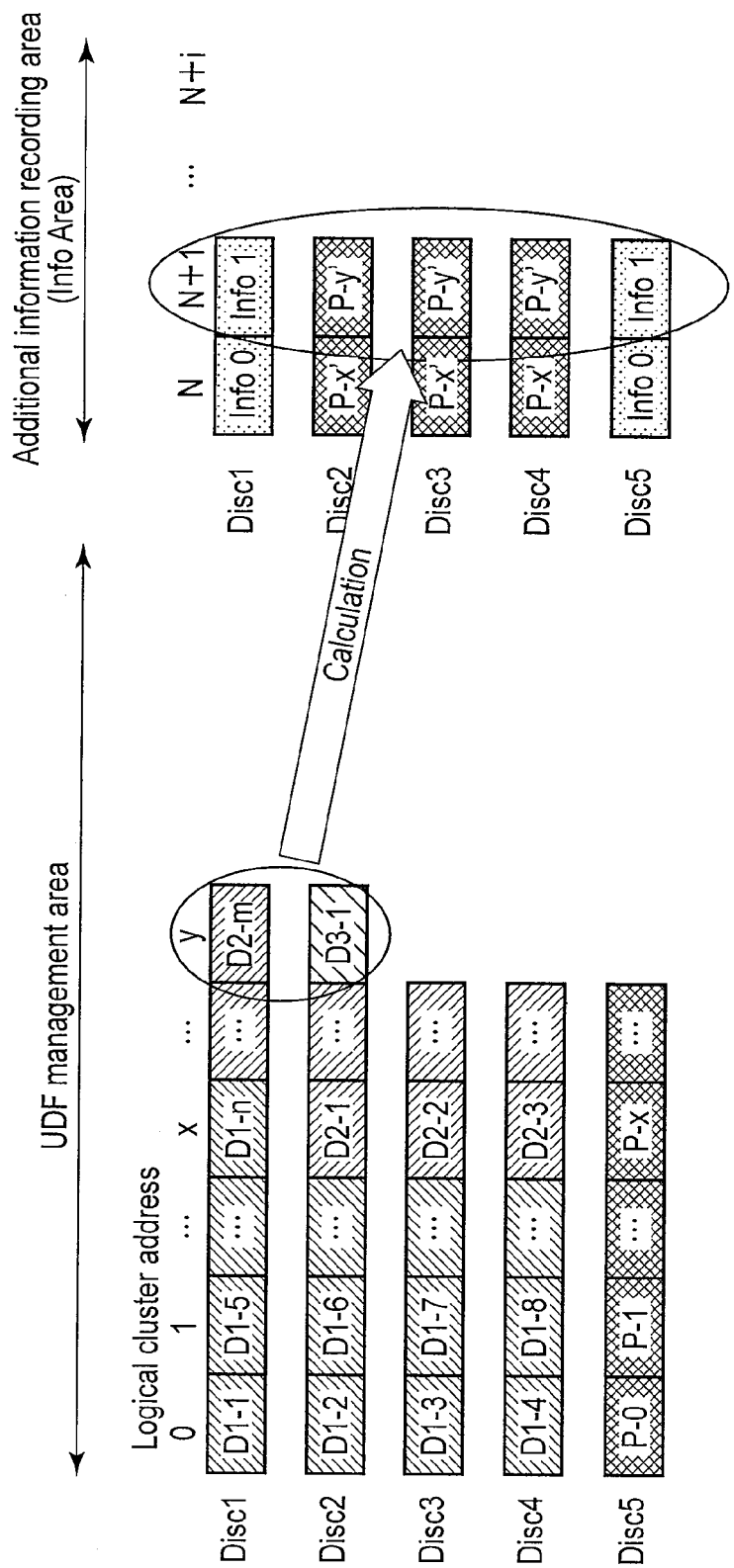
F I G. 23

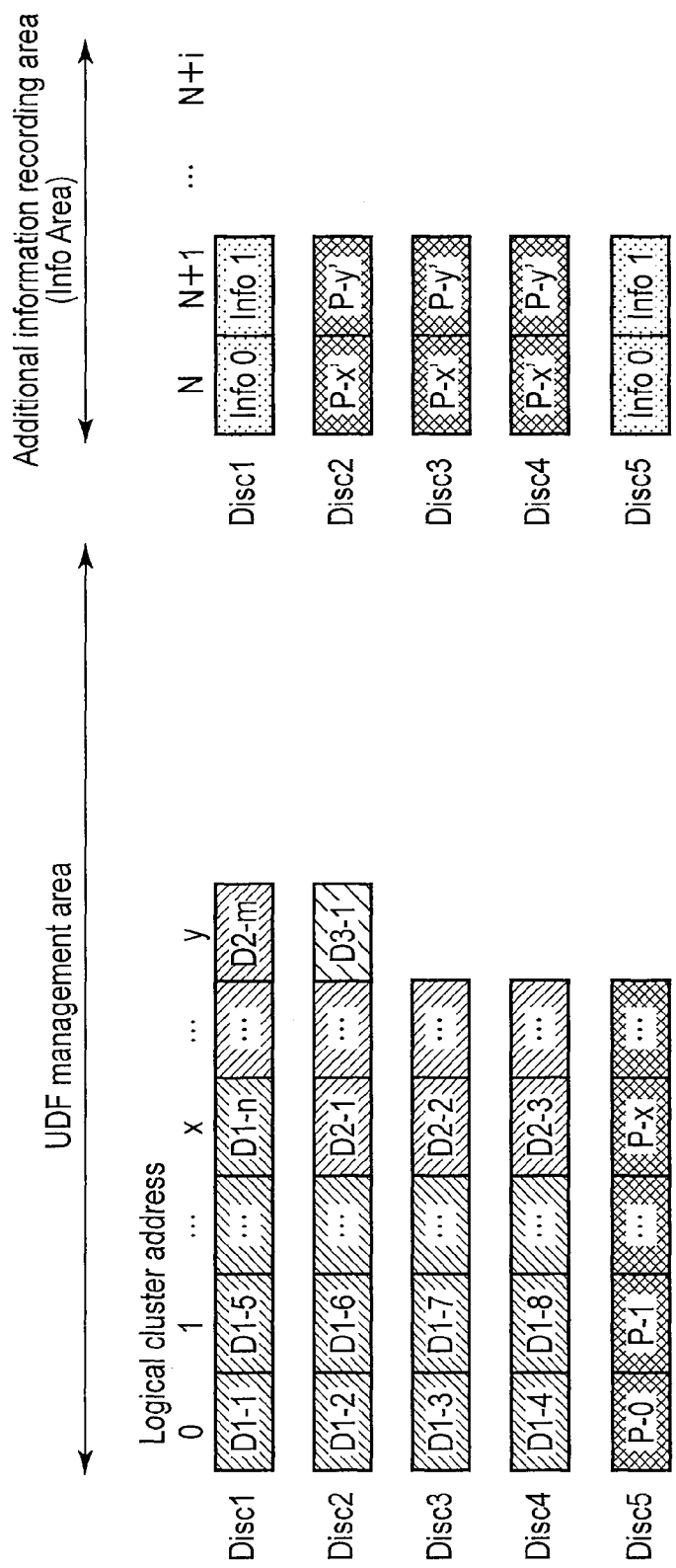
F I G. 24

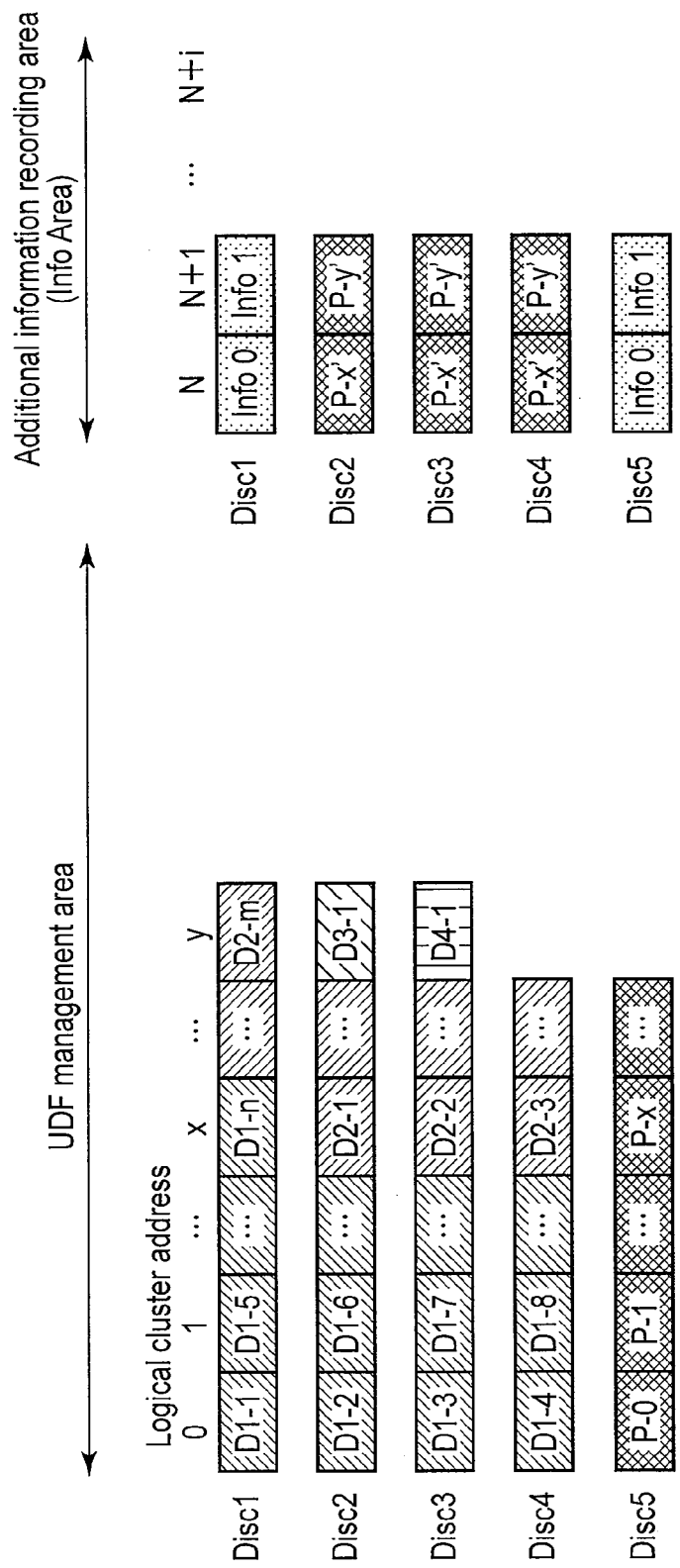
F I G. 25

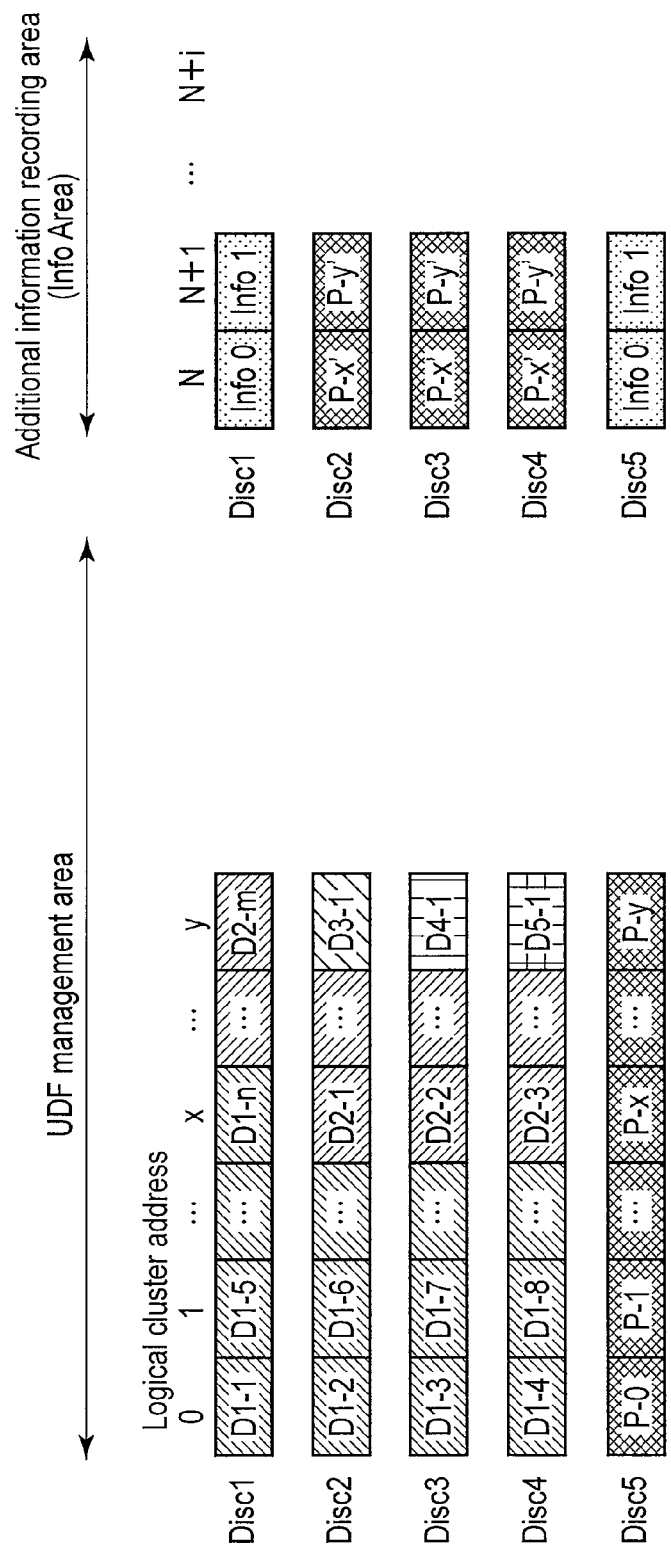
F I G. 26

INFORMATION RECORDING APPARATUS, INFORMATION PLAYBACK APPARATUS, AND FORMATTING METHOD

CROSS-REFERENCE TO RELATED APPLICATIONS

This application is based upon and claims the benefit of priority from Japanese Patent Applications No. 2012-176383, filed Aug. 8, 2012; and No. 2013-119959, filed Jun. 6, 2013, the entire contents of all of which are incorporated herein by reference.

FIELD

Embodiments described herein relate generally to an information recording apparatus, information playback apparatus, and formatting method.

BACKGROUND

There is known a recording system which divides recording data to generate a plurality of divided recording data, and distributively records these divided recording data on a plurality of information recording media. There is also known a recording system which divides recording data not corresponding to important data to generate a plurality of divided recording data, distributively records these divided recording data on a plurality of information recording media, and records recording data corresponding to important data on one or more information recording media without dividing it. Further, there is known a recording system which generates parity data from a plurality of divided recording data, distributively records these divided recording data on a plurality of information recording media, and records the parity data on another information recording medium.

As described above, there is known a recording system which records parity data on an information recording medium for parity data other than a plurality of information recording media for recording data. However, the storage capacity of an information recording medium may not be effectively used depending on circumstances. A demand has arisen for a technique capable of effectively using the storage capacity of an information recording medium in a case in which parity data is recorded.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1A is a view exemplifying a system according to an embodiment;

FIG. 1B is a block diagram exemplifying the schematic arrangement of the system according to the embodiment;

FIG. 15 is a view exemplifying recording of a temporary parity and the like in Info Area;

FIG. 16 is a view exemplifying recording of a temporary parity and the like in Info Area;

FIG. 19 is a view for explaining an example of data playback processing;

FIG. 20 is a view for explaining an example of data playback processing;

FIG. 21 is a view exemplifying recording of a temporary parity and the like in Info Area;

FIG. 22 is a view exemplifying additional write of recording data;

FIG. 23 is a view exemplifying recording of a temporary parity and the like in Info Area;

FIG. 24 is a view for explaining an example of data playback processing;

FIG. 25 is a view exemplifying additional write of recording data; and

FIG. 26 is a view exemplifying additional write of recording data and a parity.

DETAILED DESCRIPTION

Figure 2:
FIG. 2 is a view exemplifying the storage area of the system when viewed from a PC.

Various embodiments will be described hereinafter with reference to the accompanying drawings.

In general, according to one embodiment, an information recording apparatus includes a divider, a generator, and a recorder. The divider is configured to divide recording data into a plurality of recording data blocks for each predetermined recording unit. The generator is configured to set, as a first block set, n recording data blocks recorded in corresponding areas in file system management areas of n, first to nth (n: integer, n≥2) storages, and generate first parity data from the n recording data blocks forming the first block set. The recorder is configured to record the n recording data blocks forming the first block set and the first parity data.

FIG. 1A is a view exemplifying a system (information recording apparatus and information playback apparatus) according to an embodiment. As shown in FIG. 1A, a system 100 is formed from a plurality of optical disc drives connected parallelly. For example, the system 100 is formed from five BD-R drives connected parallelly. The embodiment will describe a case in which five BD-R drives connected parallelly are applied. However, the recording medium is not limited to a BD-R, and various media (for example, various write-once media) are applicable.

The system 100 can parallelly record/play back data (recording data) on/from four BD-R media out of five BD-R media inserted into the five BD-R drives, and a parity on/from one BD-R medium. For example, the format of the BD-R medium uses UDF1.5.

As shown in FIG. 1B, the system 100 includes a main controller 101, optical disc drive (recorder/reader) 102, data processor (divider/generator/parity checker) 103, data input/output unit 104, and eject controller 105.

The main controller 101 controls the overall system 100 (optical disc drive 102, data processor 103, data input/output unit 104, and eject controller 105). The optical disc drive 102 records various data on a plurality of optical discs, and reads various data from them, details of which will be described later. The data processor 103 divides various data, generates various data, and checks data (data block) based on parity data, details of which will be described later. The eject controller 105 controls execution of ejection. The data input/output unit 104 receives data from a PC 200 and outputs data to it.

When the system 100 is connected to the PC 200, dedicated drives (Drive Top and Drive Bottom) are installed in the five BD-R drives connected in parallel. Accordingly, the system 100 regards the five BD-R drives (five BD-R media) as one large-capacity storage device (to be referred to as a drive system hereinafter), similar to HDD RAID and the like. The PC 200 handles the system 100 as one large-capacity storage device.

Figure 3:
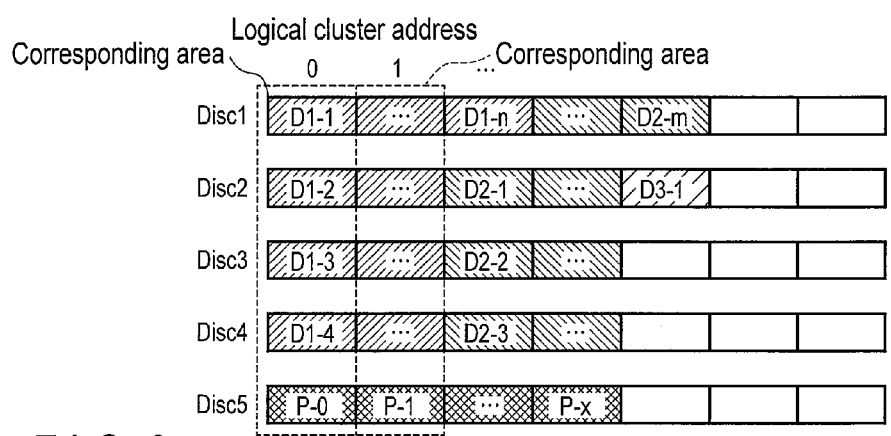
FIG. 3 is a view exemplifying recording of divided recording data blocks.

For example, data recorded in the system 100 seems to be recorded in one large-capacity storage, as shown in FIG. 2, when viewed from the PC 200. In practice, however, the data is divided as shown in FIG. 3, and the divided data are recorded in the UDF management area (file system management area) in the system 100. One recording unit formed from a plurality of storage media will be called a media set. Note that UDF stands for Universal Disc Format.

Terms used in the embodiment will be defined.

Figure 9:
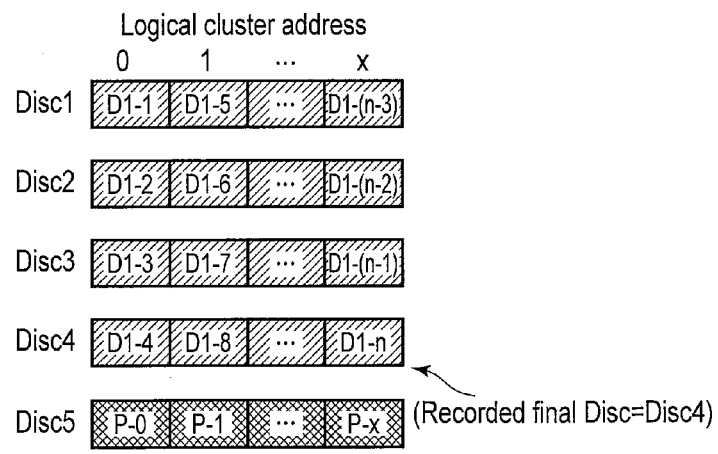
FIG. 9 is a view exemplifying recording on a media set (recorded final Disc=Disc4)
Figure 10:
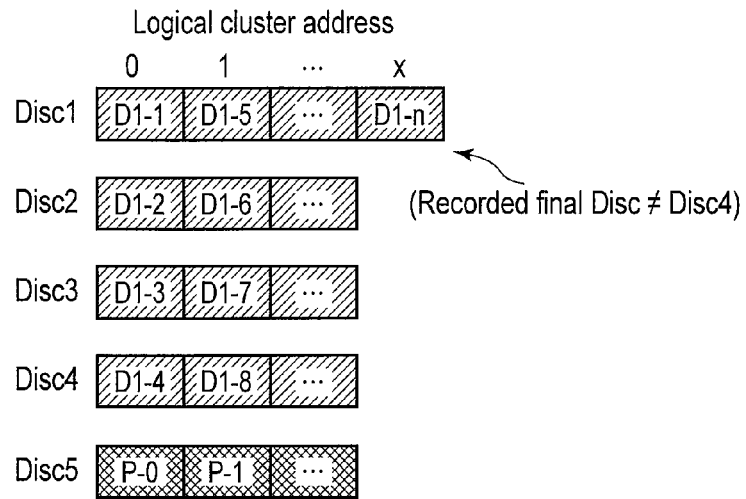
FIG. 10 is a view exemplifying recording on a media set (recorded final Disc≠Disc4)
Figure 12:
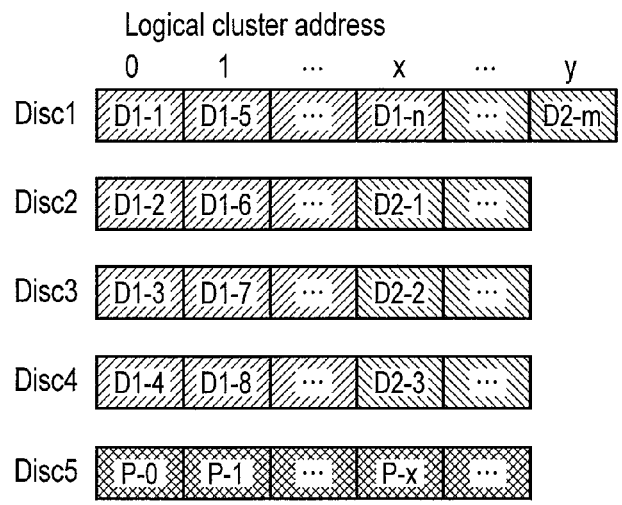
FIG. 12 is a view exemplifying additional write of data on the media set.

Recorded final logical cluster address: the final logical cluster address of data recorded on the media set x shown in FIGS. 9 and 10 and y shown in FIG. 12 correspond to the recorded final logical cluster address.

Recorded final Disc: the final Disc of data recorded on the media set

Disc4 shown in FIG. 9 and Disc1 shown in FIGS. 10 and 12 correspond to the recorded final Disc.

Figure 4:
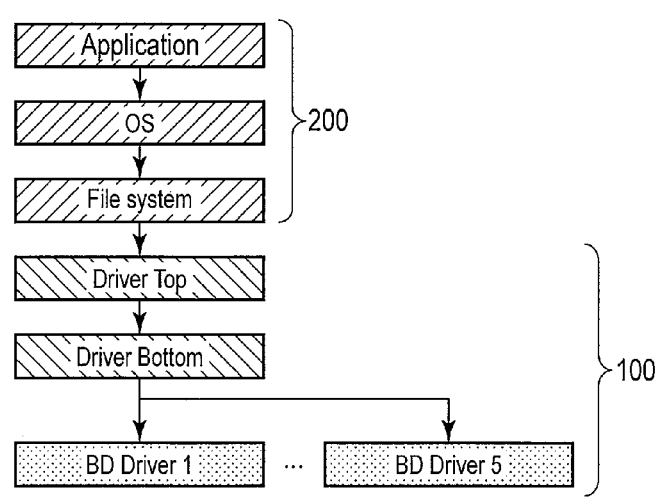
FIG. 4 is a view exemplifying the schematic arrangement of an overall system including the PC and system.

Next, the sequence of recording processing in the system including the connected PC 200 will be explained with reference to FIG. 4. FIG. 4 is a block diagram showing the schematic arrangement of the overall system including the PC 200 and system 100. The PC 200 includes a main control unit, storage unit, and input/output unit, and is further formed from application software, operating system (OS), and File System. The system 100 is formed from built-in dedicated drives (Drive Top and Drive Bottom), BD Drive 1, BD Drive 2, BD Drive 3, BD Drive 4, and BD Drive 5.

Recording data to be recorded and a recording destination are designated in the application software. As described above, the recording destination seems to be one large-capacity storage when viewed from layers above the dedicated drives, that is, the application software, OS, and File System in FIG. 4. Hence, when transmitting recording data from the application software, OS, and File System to the dedicated drives, the recording destination is not represented as recording destinations corresponding to the five BD Drives, but a recording destination corresponding to the large-capacity storage. In actual recording in each Drive, a recording destination and recording data corresponding to the large-capacity storage need to be converted into a recording destination and recording data corresponding to each drive. The dedicated drives perform this processing.

Figure 5:
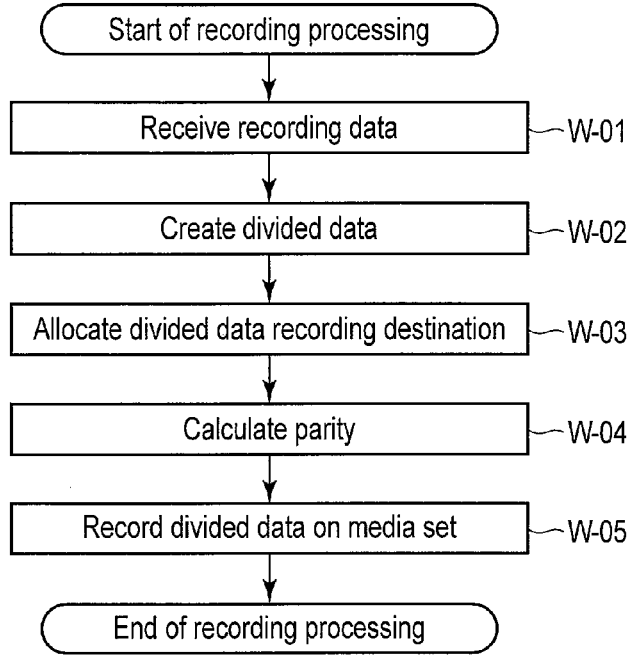
FIG. 5 is a flowchart exemplifying Write processing.

The operations of the dedicated drives in the system and the sequence of recording processing in the system will be explained with reference to FIG. 5.

W-01. Reception of Recording Data

The system 100 receives, from the PC 200, recording data (Data1 in FIG. 7) selected using application software (for example, Explorer). As described above, a recording destination corresponding to the large-capacity storage is designated for the received data.

W-02. Creation of Divided Data

The system 100 divides the recording data (Data1 in FIG. 7) received from the PC 200 (File System) for recording on the respective BD-Rs, thereby creating a plurality of divided recording data. Since the system 100 uses the UDF1.5 format, it divides the recording data into a plurality of divided recording data blocks for each 64-Kbyte cluster size. The number of divided recording data blocks is n, and the respective divided recording data blocks are D1-1, D1-2, . . . , D1-n (see FIG. 8).

W-03. Allocation of Recording Destination of Divided Recording Data Block

The system 100 allocates the recording destinations of a plurality of divided recording data blocks to the respective BD-Rs (to the UDF management areas of the respective BD-Rs).

Details of this processing will be explained below.

W-03-01. Acquisition of Start Logical Cluster Address and Disc of Recordable Area First, the system 100 reads the respective BD-Rs, acquires the recorded final logical cluster address and recorded final Disc of the media set, and obtains the start logical cluster address and Disc of a recordable area. When the recorded final Disc is Disc4 (see FIG. 9), the start of a recordable area is the logical cluster address=the recorded logical cluster address+1 (x+1 in FIG. 9), and Disc=Disc1. For a new media set immediately after formatting, the start logical cluster address=0, and Disc=Disc1.

W-03-02. Allocation of Recording Destination to Each Divided Recording Data Block The system 100 successively allocates a plurality of divided recording data blocks created in W-02 to the start cluster address and Disc (recording destination) of the recordable area acquired in W-03-01. For example, when recording divided recording data blocks in FIG. 8 on a new media set, D1-1: logical cluster address=0 and Disc=Disc1, D1-2: logical cluster address=0 and Disc=Disc2, D1-3: logical cluster address=0 and Disc=Disc3, and D1-4: logical cluster address=0 and Disc=Disc4, as shown in FIG. 9.

W-04: Calculation of Parity

The system 100 calculates a parity to be added to a plurality of divided recording data blocks in order to improve reliability.

Figure 6:
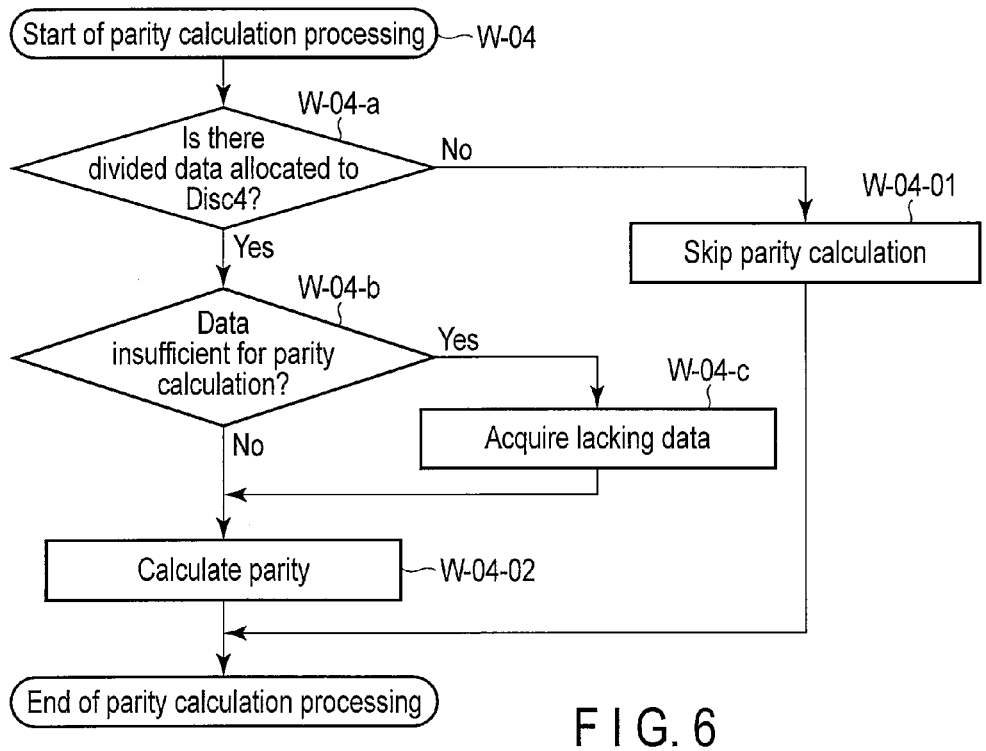
FIG. 6 is a flowchart exemplifying calculation of a parity in Write processing.

Details of the parity calculation processing will be explained with reference to FIG. 6. The parity calculation processing is roughly divided into two, W-04-01 and W-04-02.

W-04-01. Skip of Parity Calculation

To calculate a parity, all data from Disc1 to Disc4 need to be prepared for areas of corresponding logical cluster addresses. If data are insufficient, no parity can be calculated, so the parity calculation processing is skipped. Since the system 100 successively records data, if data has not been recorded in an area of a corresponding logical cluster address on Disc4 out of areas of the corresponding logical cluster addresses on Disc1 to Disc4 (NO in W-04-a), the system 100 determines that all data for Disc1 to Disc4 have not been prepared. For example, when all data have not been recorded in four areas of logical cluster addresses 0 on Disc1 to Disc4, all data have not been prepared, and the system 100 determines to skip the parity calculation processing (W-04-01).

W-04-02. Calculation of Parity

If data are to be recorded in areas of corresponding logical cluster addresses on Disc1 to Disc4 (NO in W-04-b), the system 100 calculates a parity based on the data to be recorded in the areas of the corresponding logical cluster addresses on Disc1 to Disc4 (W-04-02). As described above, the system 100 successively records data. Thus, if there is a divided recording data block allocated to an area of the corresponding logical cluster address on Disc4 out of areas of the corresponding logical cluster addresses on Disc1 to Disc4, the system 100 records divided recording data blocks in the areas of the corresponding logical cluster addresses on Disc1 to Disc4.

As shown in FIG. 9, the system 100 records divided recording data blocks D1-1, D1-2, D1-3, and D1-4 in areas of corresponding logical cluster addresses 0 on Disc1 to Disc4, records divided recording data blocks D1-5, D1-6, D1-7, and D1-8 in areas of corresponding logical cluster addresses 1 on Disc1 to Disc4, and records divided recording data blocks D1-(n−3), D1-(n−2), D1-(n−1), and D1-n in areas of corresponding logical cluster addresses x on Disc1 to Disc4. In this case, the system 100 can calculate a parity P-0 from the four divided recording data blocks recorded in the areas of corresponding logical cluster addresses 0 on Disc1 to Disc4, calculate a parity P-1 from the four divided recording data blocks recorded in the areas of corresponding logical cluster addresses 1 on Disc1 to Disc4, and calculate a parity P-x from the four divided recording data blocks recorded in the areas of corresponding logical cluster addresses x on Disc1 to Disc4. That is, the system 100 generates divided recording data blocks shown in FIG. 8 from recording data (Data1) shown in FIG. 7. When recording the divided recording data blocks, as shown in FIG. 9, the system 100 calculates a parity from all the divided recording data blocks. Note that four divided recording data blocks recorded in corresponding areas of Disc1 to Disc4 will be defined as one block set.

Figure 7:
FIG. 7 is a view exemplifying recording data (Data1)
Figure 8:
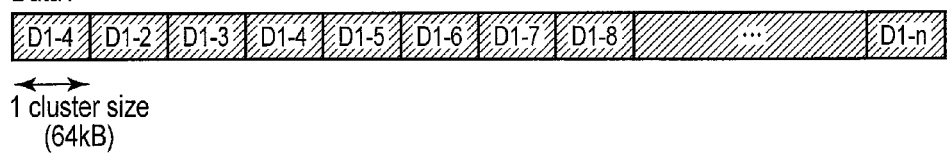
FIG. 8 is a view exemplifying divided recording data blocks generated by dividing the recording data (Data1)
Figure 11:
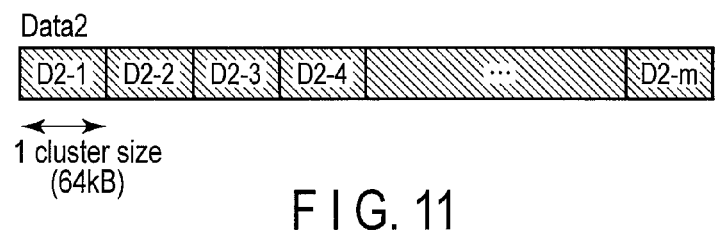
FIG. 11 is a view exemplifying divided recording data blocks generated by dividing recording data (Data2)

For example, when the system 100 generates divided recording data blocks shown in FIG. 8 from recording data (Data1) shown in FIG. 7 and records them as shown in FIG. 10, the system 100 does not calculate parities from all the divided recording data blocks. That is, the system 100 does not calculate a parity from the divided recording data block D1-n. When the system 100 additionally writes recording data (Data2) shown in FIG. 11 while data has already been recorded, as shown in FIG. 10, a parity P-x cannot be calculated from only the divided data of Data2. Thus, the system 100 reads the recorded divided recording data block D1-n (W-04-c), and calculates the parity P-x from the divided recording data blocks D1-n, D2-1, D2-2, and D2-3 (W-04-02).

W-05. Recording on Media set

The system 100 instructs the respective BD Drives to record the allocated divided recording data blocks. In response to this, the respective BD Drives can parallelly record the allocated divided recording data blocks in the respective media.

The recording processing in the system 100 has been described.

Figure 13:
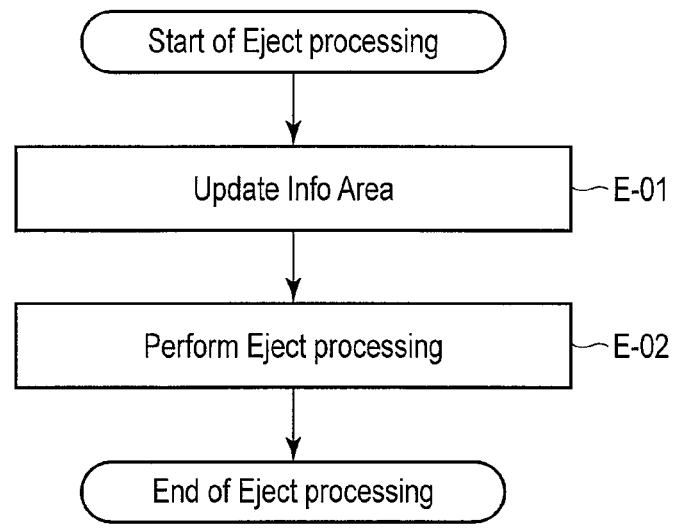
FIG. 13 is a flowchart exemplifying eject processing.

Next, Eject processing for a media set will be explained with reference to FIG. 13.

E-01. Updating of Info Area

The system 100 performs Info Area update processing upon receiving an Eject instruction (command).

Info Area will be explained.

Info Area is an area where a temporary parity created from currently recorded information is recorded at a logical cluster address at which no divided recording data block has been written up to Disc4. Info Area is an area set outside the UDF management area.

For example, in FIG. 10, the recorded final logical cluster address is x, and the recorded final Disc is Disc1. In this situation, when the system 100 receives Eject processing for the media set, it calculates a temporary parity P-x' from recorded data at recorded final logical cluster address x (from only divided recording data block D1-n in the case of FIG. 10). As shown in FIG. 15, the system 100 records the temporary parity P-x' at address N of Info Area of Disc2 which is a Disc next to the recorded final Disc. Also, the system 100 creates and records management information (Info). As shown in FIG. 15, the system 100 records Info at two portions, i.e., Disc1 and Disc5, giving redundancy to Info. For example, the Info size is 64 Kbytes, which is equal to the UDF1.5 cluster size, similar to the parity. Info contains management information such as the recording date & time, the recorded final Disc, the recorded final logical cluster address, the Info version number (version number is incremented every time data is recorded in Info Area), and the serial ID of a media set.

Figure 14:
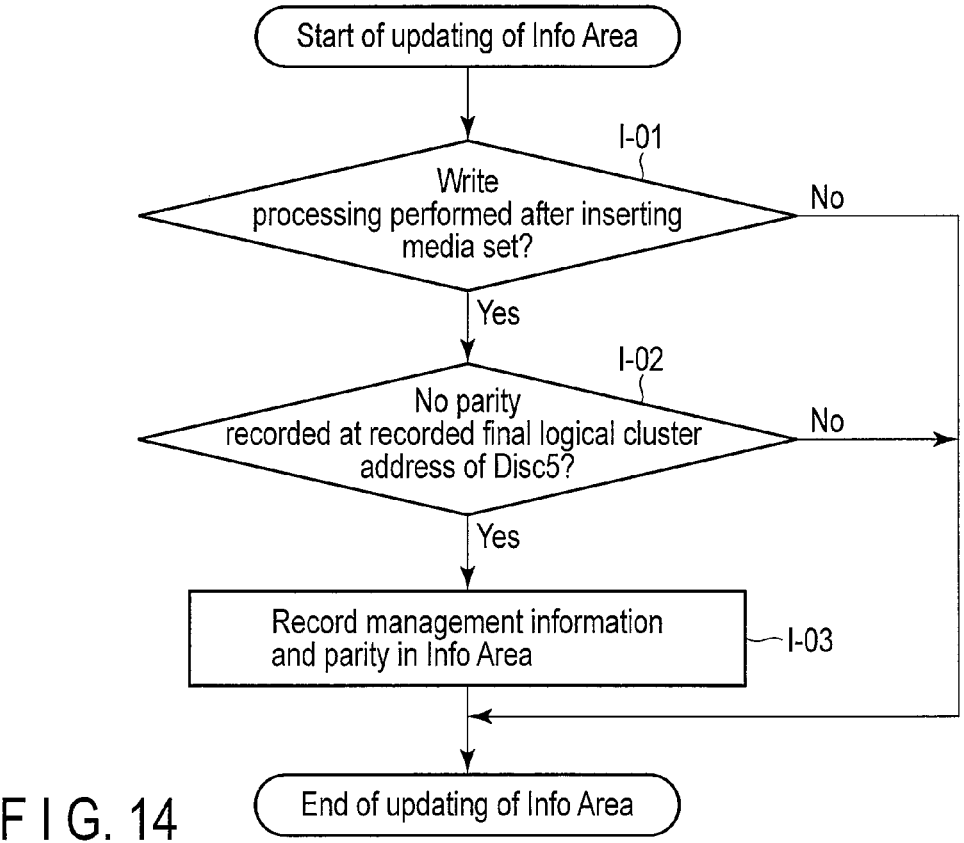
FIG. 14 is a flowchart exemplifying Info Area update processing.

Details of Info Area update processing will be explained with reference to FIG. 14.

The system 100 checks whether data recording processing has been performed after a currently set media set is inserted (I-01). If recording processing has never been performed (NO in I-01), the system 100 performs Eject processing for the media set. If recording processing has been performed, the system 100 acquires, from Drive Bottom, the final logical cluster address (to be referred to as a recorded final logical cluster address hereinafter: x shown in FIGS. 9 and 10 and y shown in FIG. 12 correspond to the recorded final logical cluster address) of divided recording data blocks recorded on the media set, and a final Disc (to be referred to as a recorded final Disc hereinafter: Disc4 in FIG. 9 and Disc1 in FIGS. 10 and 12 correspond to the recorded final Disc) on which a divided recording data block is recorded. If the final Disc on which a divided recording data block is recorded is Disc4, as shown in FIG. 9, a parity has been recorded for a recorded final logical cluster address (NO in I-02), the system 100 performs Eject processing directly. If the final Disc on which a divided recording data block is recorded is a Disc other than Disc4, as shown in FIGS. 10 and 12, no parity has been recorded for a recorded final logical cluster address (YES in I-02), the system 100 calculates a temporary parity from the divided recording data block recorded in an area of the recorded final logical cluster address, and records it in Info Area together with Info (I-03).

A case in which a media set is inserted again upon completion of Eject processing for the media set, Data2 and Data3 are additionally written, and then Eject processing is received again will be explained with reference to FIG. 16.

The recorded final Disc in this state is Disc2, and the recorded final logical cluster address is y. The system 100 calculates a temporary parity P-y' from a divided recording data block D2-m of Disc1 and a divided recording data block D3-1 of Disc2 that are recorded at the recorded final logical cluster address y. Since recording has been completed up to address N, the system 100 records the calculated temporary parity P-y' in Info Area at next address N+1 on Disc3 which is a Disc next to the recorded final Disc. Similarly, the system 100 records management information (Info) at Info Area addresses N+1 on Disc1 and Disc5.

E-02. Eject Processing

Upon completion of recording in Info Area, as needed, the system 100 performs Eject processing for the media set.

Next, data playback processing will be described.

For example, the system 100 may be in units of LBA (Logical Block Addresses) to access data, to reproduce the data. In addition, it is 32LBA=1 cluster.

When a media set is inserted, Drive Top in the system 100 checks Info Area recorded on a BD-R, and acquires a recorded final Disc and recorded final logical cluster address from Info (for example, Info1 shown in FIG. 17) in Info Area of the latest version number. Also, the system 100 creates data such as a list of recorded data (Data1, Data2, and Data3 shown in FIG. 17) and the remaining recordable capacity, and notifies the PC 200 of the data. These data are used in an application such as Explorer.

As shown in FIG. 2, the system 100 seems to be one large-capacity storage when viewed from the PC 200. When the system 100 receives a playback request from the PC 200 for recorded data, Drive Top in the system 100 converts the address and size of data requested from File System, that is, the address and size of data when the system 100 is regarded as one large-capacity storage, as shown in FIG. 2, into the start logical cluster address, start Disc, final logical cluster address, and final Disc of divided data on the media set within the system, as shown in FIG. 3. Then, Drive Top instructs Drive Bottom about Read processing for data and a parity. Drive Top receives data and a parity from Drive Bottom, and if there is no problem after a parity check, couples data, and sends the coupled data as a Read result.

Figure 18:
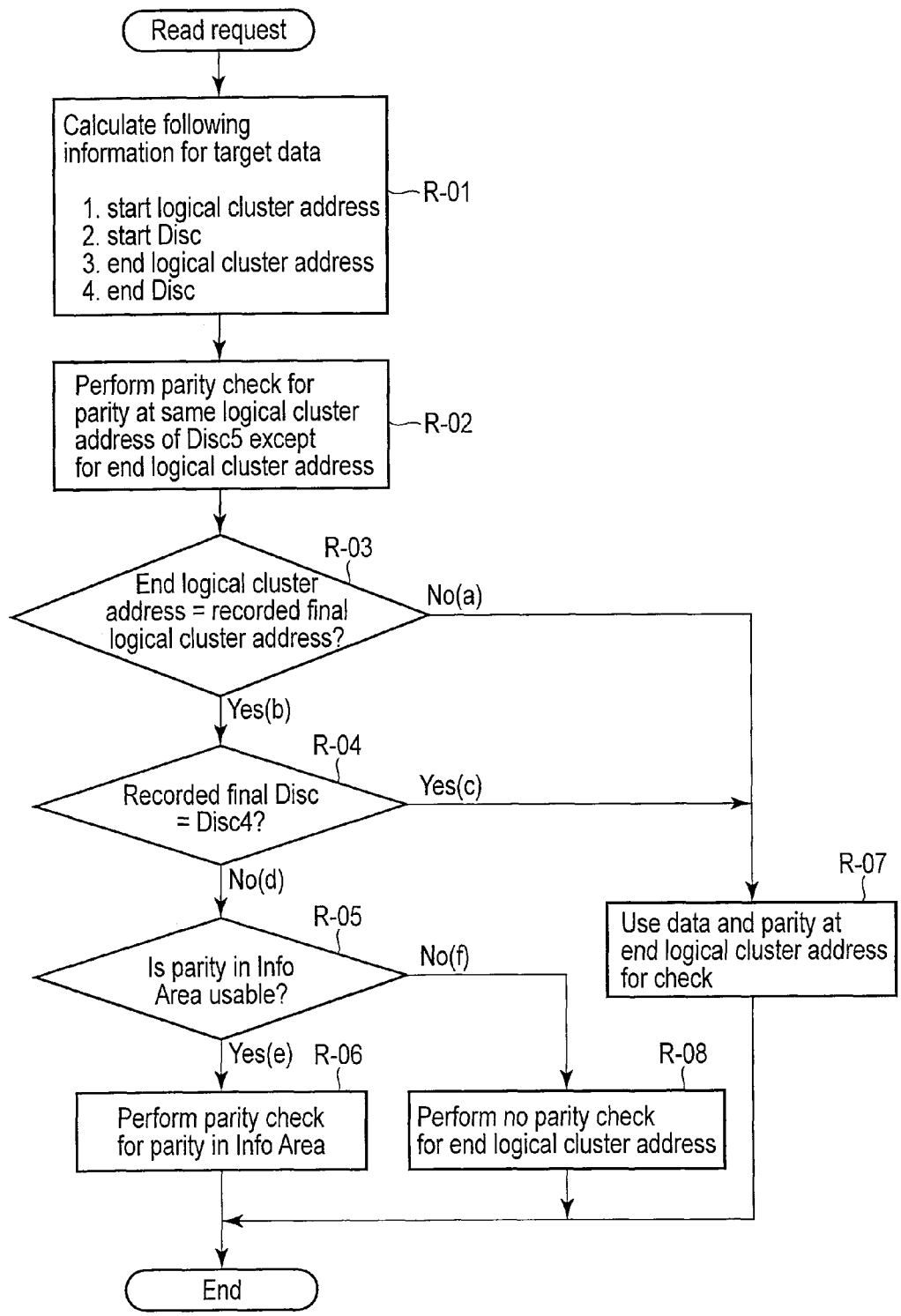
FIG. 18 is a flowchart exemplifying a parity check in data playback.

Details of the parity check by Drive Top will be explained with reference to FIG. 18.

R-01. Calculation of Information of Target Data

Figure 17:
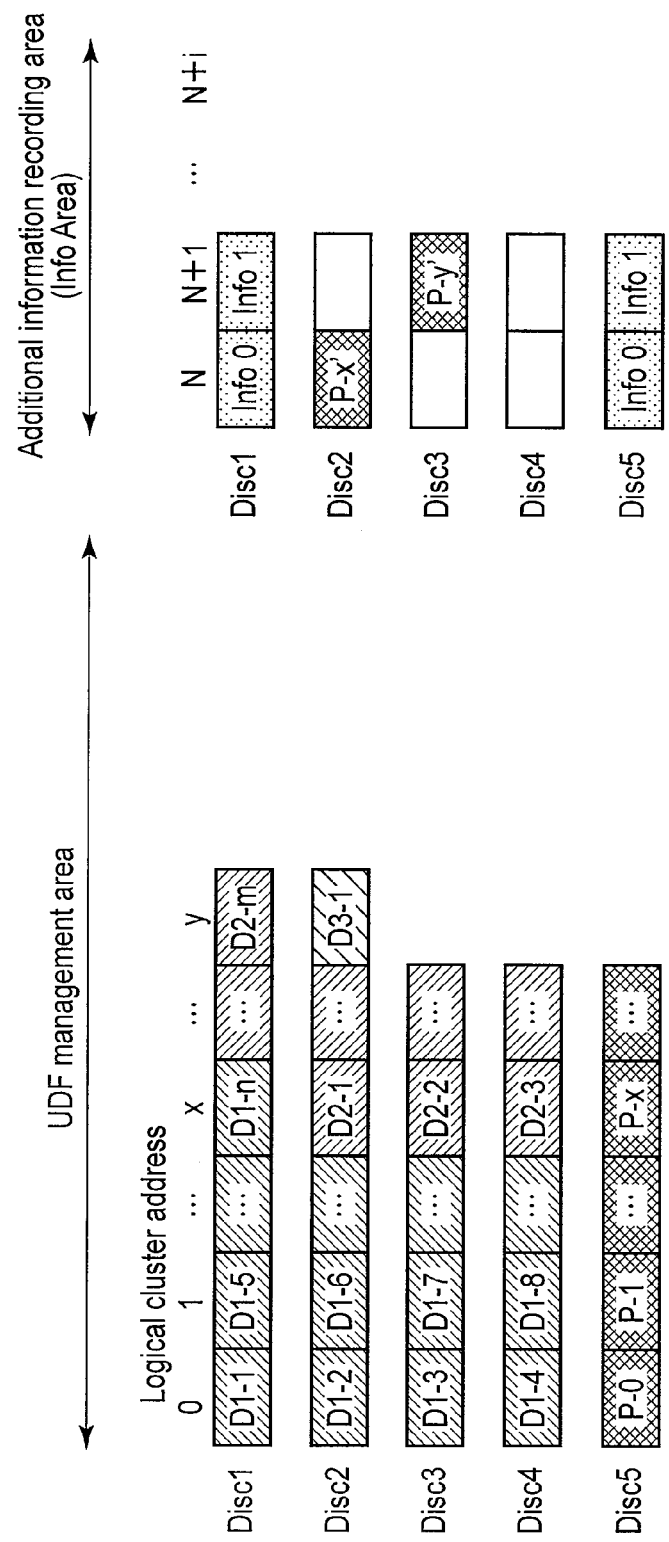
FIG. 17 is a view for explaining an example of data playback processing.

Upon receiving a playback request from the PC 200, Drive Top calculates the following information for target data on the media set based on the address and size of data requested from File System (R-01):

(1) start logical cluster address (2) start Disc (3) end logical cluster address (4) end Disc If a playback request for Data1 formed from D1-1, . . . , D1-n is received in the data recording situation shown in FIG. 17, the start logical cluster address=0, the start Disc=Disc1, the end logical cluster address=x, and the end Disc=Disc1.

R-02. Parity Check for Data Except for End Logical Cluster address

Since the system 100 successively records data on the media set, Drive Top performs a parity check using parities recorded on Disc5 except for the end logical cluster address (R-02).

R-03-R-08. Parity Check for Data at End Logical Cluster address

A parity check for the end logical cluster address will be described.

A case in which the end logical cluster address precedes the recorded final logical cluster address of the media set (NO(a) in R-03) will be explained. When playing back Data1 shown in FIG. 17, the recorded final cluster address of the media set is y with respect to the end logical cluster address of divided data of Data1=x, and the system 100 successively records data on the media set, and thus parities exist on Disc5 except for the recorded final cluster address of the media set. Drive Top therefore uses parities on Disc5 for a parity check of the final logical cluster address of divided data (R-07).

Next, a case in which the end logical cluster address of divided data is the same as the recorded final logical cluster address of the media set (YES(b) in R-03) will be explained.

If the recorded final Disc=Disc4, as shown in FIG. 19 (YES(c) in R-04), parities calculated from data recorded on Disc1 to Disc4 are recorded on Disc5, and Drive Top performs a parity check using the parities recorded on Disc5 (R-07).

If the recorded final Disc≠Disc4, as shown in FIG. 20 (NO(d) in R-04), Drive Top checks whether a parity recorded in Info Area is usable. For data serving as the basis of parity calculation, like Data2 and Data3 in FIG. 20, Drive Top performs a parity check based on a temporary parity (P-y') stored in Info Area and data used in calculation (YES(e) in R-05) (R-06). For data for which no parity is usable, like Data4 in FIG. 20, no Eject processing has been performed for the media set after data recording, the possibilities of a parity error and data alteration are low, and thus the system 100 does not perform a parity check (NO(f) in R-05) (R-08).

In the embodiment, an example of the recording destination of a temporary parity has been explained with reference to FIGS. 15 and 16 and the like. However, the recording destination of a temporary parity is not limited to this. A temporary parity can be recorded at an arbitrary recording destination outside the UDF management area of at least one of Disc1 to Disc5.

For example, as shown in FIGS. 21, 22, 23, 24, 25, and 26, a plurality of temporary parities (for example, temporary parities P-x') may be recorded, and a parity check may be performed using at least one temporary parity. More specifically, as shown in FIG. 21 (corresponding to FIG. 15), the system 100 records the temporary parities P-x' at addresses N in Info Areas of Disc2 to Disc4, and records Info0 at addresses N in Info Areas of Disc1 and Disc5. That is, the system 100 records the temporary parities P-x' at three portions on Disc2 to Disc4, and records Info0 at two portions on Disc1 and Disc5, thereby giving redundancy to both the temporary parities P-x' and Info0. In playback, the system 100 can read the temporary parity P-x' in Info Area of a Disc (Disc2) next to the recorded final Disc (Disc1), and perform a parity check for a data block D1-n based on the temporary parity P-x'. That is, the above-described parallel processing can be executed, and the playback time can be shortened. Also, in playback, the system 100 can read a plurality of temporary parities P-x' in Info Areas of Disc2 to Disc4, and confirm the identity of the temporary parities P-x'. This can improve the reliability of reading of the temporary parity.

As shown in FIGS. 22 and 23, when the system 100 additionally writes Data2 (D2-1 to D2-m) and Data3 (D3-1), and receives, for example, Eject processing, it creates a temporary parity P-y' from D2-m and D3-1, records it at three portions at addresses N+1 in Info Areas of Disc2 to Disc4, and records Info1 at two portions at addresses N+1 in Info Areas of Disc1 and Disc5. In playback, as shown in FIG. 24, the system 100 can read the temporary parity P-y' in Info Area of a Disc (Disc2) next to the recorded final Disc (Disc1), and perform a parity check for D2-m and D3-1 based on the temporary parity P-y'. Also, in playback, the system 100 can read the temporary parities P-y' in Info Areas of Disc2 to Disc4, and confirm the identity of the temporary parities P-y'. This can improve the reliability of reading of the temporary parity.

Further, when the system 100 additionally writes D4-1 and D5-1, as shown in FIGS. 25 and 26, it generates a parity P-y from D2-m, D3-1, D4-1, and D5-1, and records it in an area of logical cluster address y on Disc5.

In this manner, data are sequentially recorded even in the additional information recording area. Even when a recording medium such as BD-R is applied, a temporary parity can be recorded without any problem. When a temporary parity is recorded at logical cluster address N in the additional information recording area of one Disc (Disc2) (one temporary parity is recorded), as shown in FIG. 15 and the like, padding data may be recorded at logical cluster addresses N in the additional information recording areas of other Discs (Disc3 and Disc4).

The embodiment has described a case in which Info Area is automatically updated in correspondence with an Eject instruction. However, the Info Area update timing is not limited to this, and Info Area can be updated at various timings. For example, Info Area may be updated by a manual operation to the system 100. More specifically, upon receiving an Info Area update instruction corresponding to an Info Area update operation by the user, the system 100 performs Read for a media set, checks a logical cluster address where no parity is recorded, and records Info data and a temporary parity at this cluster address in Info Area.

The embodiment will be summarized.

The system 100 can divide recording data, parallelly write the divided recording data blocks in parallelly connected recording media, and parallelly read them out. The recording and readout speeds can therefore be increased.

The system 100 can easily implement parallel recording/playback of data using a parity in a write-once storage medium.

By using a parity, the system 100 can detect a read error caused by disc damage upon carrying a storage medium, and alteration using another apparatus.

Since a parity for an area where parallel recording data are not completely recorded is temporarily saved in an area outside the file system management area, the system 100 can prevent a parity error without wasting the capacity of a storage medium.

Note that software can execute all the processes described above. Hence, the above-described processes can be implemented by only installing, in the system 100, a program for executing these processes, and executing the program.

For example, the system 100 can download the program from the server, store the downloaded program, and complete the installation of the program. Alternatively, the system 100 can read the program from a computer-readable storage medium, store the read program, and complete the installation of the program.

At least one embodiment described above can provide an information recording apparatus capable of efficiently recording parity data, and a formatting method. Also, at least one embodiment described above can provide an information playback apparatus capable of playing back recording data by using efficiently recorded parity data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information recording apparatus comprising:
   a divider configured to divide recording data into a plurality of recording data blocks for each predetermined recording unit;
   a generator configured to set, as a first block set, n recording data blocks recorded in corresponding areas in file system management areas of n, first to nth (n: integer, n≥2) storages, and generate first parity data from the n recording data blocks forming the first block set; and
   a recorder configured to record the n recording data blocks forming the first block set in first areas in the file system management areas of the n storages out of corresponding first areas in the file system management areas of the n storages and one storage, and record the first parity data in the first area in the file system management area of the one storage,
   wherein the generator is configured to extract, from the plurality of recording data blocks, n recording data blocks for forming the first block set, and configured to, when m (m: integer, m≥1) recording data blocks smaller in number than the n recording data blocks remain, generate temporary parity data based on the remaining m recording data blocks, and
   the recorder is configured to record the remaining m recording data blocks in corresponding second areas in the file system management areas of m storages out of the n storages, out of corresponding second areas in the file system management areas of the n storages and the one storage, and configured to record the temporary parity data outside the file system management area of at least one storage out of the n storages and the one storage.

2. The apparatus of claim 1, wherein the recorder is configured to record the remaining m recording data blocks in the second areas in the file system management areas of the m, first to mth storages, and configured to record the temporary parity data in a first additional information recording area of a (m+1)th storage outside the file system management area.

3. The apparatus of claim 2, wherein
   the generator is configured to generate management information corresponding to the temporary parity data, and
   the recorder is configured to record the management information outside the file system management area of at least one storage out of the n storages and the one storage.

4. The apparatus of claim 3, wherein the recorder is configured to record the management information in the first additional information recording area of a first storage outside the file system management area, out of corresponding first additional information recording areas of the n storages and the one storage outside the file system management area.

5. The apparatus of claim 4, wherein the recorder is configured to record the management information in the first additional information recording area of the one storage outside the file system management area.

6. The apparatus of claim 1, wherein
   the generator is configured to generate the temporary parity data based on a storage eject instruction, and
   the recorder is configured to record the temporary parity data.

7. The apparatus of claim 6, further comprising an eject controller configured to execute ejection of the m storages and the one storage based on the eject instruction after recording the temporary parity data.

8. The apparatus of claim 1, wherein
   the divider is configured to divide additional recording data into a plurality of additional recording data blocks for each predetermined recording unit,
   the generator is configured to set, as a second block set, the remaining m recording data blocks and (n−m) additional recording data blocks, and generate second parity data from the remaining m recording data blocks and the (n−m) additional recording data blocks which form the second block set, and the recorder is configured to record the remaining m recording data blocks and the (n−m) additional recording data blocks which form the second block set, in the second areas in the file system management areas of the n storages out of corresponding second areas in the file system management areas of the n storages and one storage, and configured to record the second parity data in the second area in the file system management area of the one storage.

9. The apparatus of claim 1, wherein the recorder is configured to parallelly record data in the n storages and the one storage which are of a write-once type.

10. An information playback apparatus comprising:
a reader configured to read data from the n storages and the one storage in claim 1; and
a parity checker configured to check, based on the first parity data, the n recording data blocks forming the first block set, and configured to check the remaining m recording data blocks based on the temporary parity data.

11. A formatting method comprising:
dividing recording data into a plurality of recording data blocks for each predetermined recording unit;

setting, as a first block set, n recording data blocks recorded in corresponding areas in file system management areas of n, first to nth (n: integer, n≥2) storages, and generating first parity data from the n recording data blocks forming the first block set;

recording the n recording data blocks forming the first block set in first areas in the file system management areas of the n storages out of corresponding first areas in the file system management areas of the n storages and one storage, and recording the first parity data in the first area in the file system management area of the one storage;

extracting, from the plurality of recording data blocks, n recording data blocks for forming the first block set, and when m (m: integer, m≥1) recording data blocks smaller in number than the n recording data blocks remain, generating temporary parity data based on the remaining m recording data blocks; and recording the remaining m recording data blocks in corresponding second areas in the file system management areas of m storages out of the n storages, out of corresponding second areas in the file system management areas of the n storages and the one storage, and recording the temporary parity data outside the file system management area of at least one storage out of the n storages and the one storage.

* * * * *